Patented Oct. 18, 1932

1,883,676

UNITED STATES PATENT OFFICE

KARL FREDENHAGEN AND BURCKHARDT HELFERICH, OF GREIFSWALD, GERMANY

DEGRADATION OF WOOD AND OTHER POLYSACCHARIDS

No Drawing. Application filed March 14, 1928, Serial No. 261,701, and in Germany March 14, 1927.

The present invention relates to the conversion of polysaccharids, such as cellulose, starch and the like into water soluble products by treatment with hydrofluoric acid.

We have found that valuable products are obtained by treating polysaccharids or materials containing the same, preferably in the air-dry state or after drying same, with hydrofluoric acid, which is absolutely free from water, in the liquid or vaporous state or with highly concentrated solutions thereof, containing less than 20 per cent of water, and preferably, at temperatures below the boiling point of water, until the reaction product is soluble in water even after the removal of the hydrofluoric acid. The time required for the reaction depends on the properties of the initial materials, on the presence of water in the acid and on the temperature employed; when working, for example, with an anhydrous hydrofluoric acid, pure cellulose is dissolved at 0° C., or even below this temperature, within a few minutes and converted into water-soluble products. Generally speaking, it is more advantageous to work at the lowest possible temperatures and to employ the acid in a practically anhydrous state, dark colored reaction products occurring, when working at too high temperatures as above 100° C. As stated above the initial material should be generally treated in the absence of substantial amounts of water, but we have found that the effect of the present method is not affected by the presence of small quantities of water not exceeding say 20 per cent by weight of the initial material.

On working in the manner described above, different products may be obtained according to the conditions employed, as regards the concentration of the hydrofluoric acid, the length of time which it is allowed for acting upon the initial material, and other variations of performing the process, so that products may be obtained which reduce Fehling solution more or less. Thus, for example, by acting with anhydrous acid upon the initial material for only a very short time water-soluble products are obtained which reduce Fehling solution to a very small degree.

The hydrofluoric acid can be removed from the reaction mass by any known manner, as by precipitation by means of calcium hydroxid or calcium carbonate or by evaporation at low temperatures. The latter method is especially advantageous when working with practically anhydrous hydrofluoric acid, which may be evaporated by passing a current of air through the reaction vessel, condensing the vapors by cooling, if desired, and directly employing the condensate in a following operation. Instead of condensing the vapors by cooling, an absorption by means of an alkali metal fluoride may be applied, the said salt being simultaneously converted into an acid fluoride, which is capable of easily absorbing further amounts of the acid. By heating the solution or melt obtained, the acid is recovered in a practically anhydrous state. When working with hydrofluoric acid in the gaseous state, the said condensation or absorption can be dispensed with, the evaporated acid being introduced into a following operation of the present process in a sort of circulatory system. Any remainders of hydrofluoric acid which may be difficultly removable by evaporation from the reaction product, may be removed by precipitation, preferably by means of calcium hydroxid or calcium carbonate.

As initial materials not only pure polysaccharids can be employed but also materials containing such, as, for example, wood, straw or reed, or other vegetable materials may be used, all of the non-polysaccharoid constituents of such materials generally remaining undissolved. Thus, in case wood has been employed, the lignine substance is not attacked and can be separated by any known method. For example, the hydrofluoric acid may be evaporated from the reaction mixture, whereupon the water-soluble products are extracted from the resulting mass by water or other suitable solvent.

The products obtained by the present process can be employed for any purpose for which saccharids of a simpler nature are applicable, such as, for example, for the production of yeast as cattle-food. By treating the products with diluted acids, for example with diluted hydrofluoric or sulfuric acid or any other hydrolyzing agent, products can be obtained which contain considerable amounts of glucose, reduce Fehling solution in a higher degree than the original products of the degradation and can be used for similar purposes, as these are employed for.

The nature of this invention will be further illustrated by the following examples to which, however, the invention is not limited. The parts are by weight.

*Example 1*

200 parts of anhydrous hydrofluoric acid are distilled over on to 100 parts of dry filter paper. For complete solution the mixture is stirred and kept for a quarter of an hour at room temperature. The main part of the hydrofluoric acid is then removed by means of a current of dry air. The remaining syrup is dissolved in water, and this solution is freed from the rest of the hydrofluoric acid by means of calcium carbonate. The filtrate is evaporated to dryness, preferably in vacuo. The residue weighs slightly more than the filter paper employed, contains only a small percentage of reducing sugar and is soluble in water.

If an aqueous solution of 85 per cent of hydrofluoric acid is employed for the conversion at 0° C., about 93 per cent of the initial material is obtained after a treatment of from 1 to 2 hours in form of a water-soluble substance with a reduction value corresponding to a content of 14 per cent by weight of glucose. A solution of 65 per cent of hydrofluoric acid dissolves filter paper at 50° C. in about 2 hours with a yield of only 88 per cent of water-soluble substance, the reduction value of which corresponds to a content of 60 per cent by weight of glucose.

*Example 2*

50 parts of anhydrous hydrofluoric acid in the gaseous state are passed at about 30° C. and in the course of about 45 minutes over 10 parts of air-dry filter paper, the latter being thereby converted into a tough syrup which contains hydrofluoric acid. This product is diluted with water, heated on a water-bath with some calcium carbonate in order to neutralize the acid and, after some shaking, is filtered, when cold, and evaporated in vacuo.

The resulting product is obtained in a yield of 94 per cent by weight of the initial material and is a white, water-soluble substance, free from fluoride and of sweetish taste.

*Example 3*

100 parts of anhydrous hydrofluoric acid are condensed upon 100 parts of chipped fir wood having a moisture content of about 1 per cent. After some time the hydrofluoric acid is removed by means of a current of dry air and by gradual heating of the reaction mixture to 100° C. The hydrofluoric acid is recovered by absorption with potassium fluorid in the form of potassium bifluorid. The product remaining after the removal of the hydrofluoric acid is extracted with boiling water and the filtrate finally evaporated, preferably in vacuo, to dryness. The white, water-soluble residue amounts to more than 65 per cent by weight of the wood employed.

*Example 4*

200 parts of anhydrous hydrofluoric acid are distilled over on to 100 parts of dried potato-starch. The mixture is stirred in order to obtain a homogeneous solution, whereupon the main part of the hydrofluoric acid is eliminated by passing a current of dry air through the solution. The remaining syrup is dissolved in water. The rest of the hydrofluoric acid is removed from this solution by means of calcium carbonate and the filtrate is evaporated in vacuo to dryness. The remaining substance weighs somewhat more than the starch employed. It is soluble in water and contains only a small percentage of reducing sugar.

What we claim is:

1. A process for the production of water-soluble degradation products of polysaccharids, which comprises acting upon a dry material containing polysaccharids at a temperature below 90° C. with hydrogen fluoride and removing the hydrofluoric acid after the reaction.

2. A process for the production of water-soluble degradation products of polysaccharids, which comprises acting upon a dry material containing polysaccharids with gaseous hydrogen fluoride at a temperature below 90° C. and removing the hydrofluoric acid after the reaction.

3. A specific method of performing the process claimed in claim 1 which comprises carrying on the degradation of the water-soluble products obtained, by heating the latter with solutions of hydrolyzing agents after the removal of the hydrofluoric acid.

4. A process for the production of water soluble degradation products of polysaccharids, which comprises acting upon a material containing polysaccharids at a temperature below 90° C. with liquid hydrogen fluoride in the presence of less than 20 per cent of water by weight of the initial material when in the dry state, and removing the hydrofluoric acid after the reaction.

5. A process for the production of water-soluble degradation products of polysaccharids, which comprises acting upon a material containing polysaccharids at a temperature below 90° C. with gaseous hydrogen fluoride in the presence of less than 20 per cent of water by weight of the initial material when in the dry state, and removing the hydrofluoric acid after the reaction.

6. A process for the production of water-soluble degradation products of polysaccharides, which comprises acting upon a material containing polysaccharids at a temperature below 90° C. with a mixture of air with hydrogen fluoride in the presence of less than 20 per cent of water by weight of the initial material when in the dry state, and removing the hydrofluoric acid after the reaction.

7. A process for the production of water-soluble degradation products of polysaccharids, which comprises acting upon a dry material containing polysaccharids at a temperature below 90° C. with liquid hydrogen fluoride and removing the hydrofluoric acid after the reaction.

8. A process for the production of water-soluble degradation products of polysaccharids, which comprises acting upon a dry material containing polysaccharids at a temperature below 90° C. with hydrogen fluoride and removing the hydrofluoric acid after the reaction by means of a current of dry air.

In testimony whereof we have hereunto set our hands.

KARL FREDENHAGEN.
BURCKHARDT HELFERICH.